A. L. BUTTERFIELD.
Velocipede.
No. 91,602. Patented June 22, 1869.
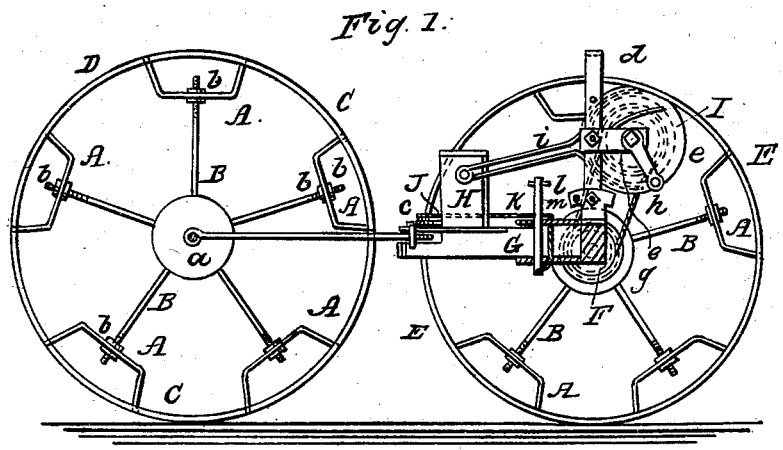
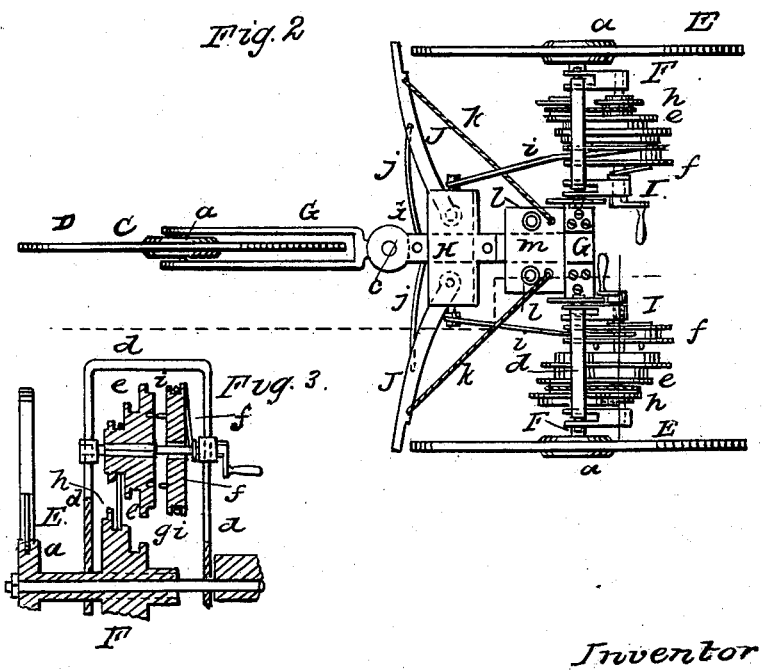
Witnesses
O. Hinchman
Geo. W. Mabee
Inventor
A. L. Butterfield
per Munn & Co.

United States Patent Office.

ABNER L. BUTTERFIELD, OF BRATTLEBOROUGH, VERMONT.

Letters Patent No. 91,602, dated June 22, 1869.

---

IMPROVEMENT IN VELOCIPEDE.

---

The Schedule referred to in these Letters Patent and making part of the same.

---

*To all whom it may concern:*

Be it known that I, ABNER L. BUTTERFIELD, of Brattleborough, in the county of Windham, and State of Vermont, have invented a new and improved Velocipede; and I do hereby declare that the following is a full, clear, and exact description thereof, which will enable others skilled in the art to make and use the same, reference being had to the accompanying drawings, forming part of this specification, in which—

Figure 1 represents a vertical longitudinal section of my improved velocipede.

Figure 2 is a plan or top view of the same.

Figure 3 is a detail vertical transverse section of the same.

Similar letters of reference indicate corresponding parts.

This invention relates to a new manner of constructing the wheels of velocipedes, for the purpose of making them stronger, and also to a new driving-mechanism, and brake-attachment, all parts being so arranged as to produce a strong and convenient velocipede.

The invention consists, first, in securing semi-elliptic springs A A to the outer ends of the wheel-spokes B B, so that the support given to the tire by each spoke is thus considerably increased, to allow a smaller number of spokes to be used.

The spokes B are, in suitable manner, fastened to the hub $a$ of the wheel, and do not reach to the tire.

A screw-thread is cut upon the outer end of each spoke, and the screw-end is fitted through the spring A, and fastened therein by means of nuts $b\ b$.

The ends of the spring are fitted through or into the tire C, so that they may be supported by shoulders formed on them.

The tire C is made of steel, or other suitable elastic material, and can, when indented or bent out of shape, be adjusted by means of the nuts $b\ b$.

The wheels thus made are light, and still sufficiently strong.

The velocipede is supported by three wheels, one wheel, D, being in rear, and the other two, E E, in front.

The front wheels, E E, are hung loose on an axle, F, which forms part of the reach G.

The rear wheel is hung in the forked rear end of the reach.

The reach is jointed at $c$, in rear of the seat H, which is supported on the reach behind the front axle.

The invention consists, secondly, in the novel arrangement of driving-mechanism.

In front of the seat are hung, in an upright frame, $d$, that projects from the reach, two crank-axles I I, which carry each a loose pulley, $e$, and a sliding clutch, $f$.

On the tubular extensions of the hubs of the front wheels, E, are also mounted some pulleys, $g\ g$, which are directly under the pulleys $e$, and which are connected with the same by means of belts $h$.

When the driver throws the clutches $f$, by means of suitable levers $i\ i$, or otherwise, against the pulleys $e$, the latter will be turned with the axles I, which have cranks to be turned by the hands or feet.

The cranks of the two axles I may, if desired, be connected to each other.

The rotation of the pulleys $e$, will also cause the wheels E to be revolved.

The power can be regulated by shifting the belts on the pulleys, which are of different sizes, as shown.

The device is steered by throwing one or the other of the wheels out of gear, by means of the clutch.

The invention finally consists in the arrangement of a new brake-device. In this, there are two levers, J J, pivoted to the reach, behind the wheels E E, as shown. Springs $j$ hold them away from the wheels.

With each lever J is connected a cord or chain, K, which is fastened to a vertical pin, $l$, fitted through the foot-board $m$ of the reach.

By forcing down one or both of the pins $l$, the chains K will be pulled so as to hold the brake-levers against the wheels.

When a pin, $l$, is released, the spring $j$ will at once throw the brake off the wheel.

The seat may be made in box form, as shown, to serve as a receptacle for articles to be conveyed.

Having thus described my invention,

I claim as new, and desire to secure by Letters Patent—

1. The springs A, constituting the outer ends of the spokes, and supporting the tires, substantially as herein shown and described.

2. The combination of the axles I I, which carry the loose pulleys $e$ and the sliding clutches $f$, with the pulleys $g$ formed on the wheels E, substantially as herein shown and described, to provide a combined driving and steering-mechanism, as specified.

3. The brake-levers J J, when arranged in combination with the springs $j$, chains K, and vertical pins $l$, substantially as herein shown and described, to operate as set forth.

ABNER L. BUTTERFIELD.

Witnesses:
JOSEPH STERN,
N. D. ALLEN.